US012774095B2

(12) United States Patent
Billon et al.

(10) Patent No.: US 12,774,095 B2
(45) Date of Patent: Oct. 27, 2026

(54) AIRCRAFT STRUCTURE WITH TAPERED BASE, AND ASSOCIATED AIRCRAFT CABIN

(71) Applicant: DASSAULT AVIATION, Paris (FR)

(72) Inventors: Jean-Rémi Billon, Saint Cloud (FR); Matthieu Hautem, Saint-Cloud Cedex (FR); Quentin Foos, Saint-Cloud Cedex (FR); Maxime Nicot, Saint-Cloud Cedex (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 18/892,042

(22) Filed: Sep. 20, 2024

(65) Prior Publication Data

US 2026/0084821 A1 Mar. 26, 2026

(30) Foreign Application Priority Data

Sep. 26, 2023 (FR) ....................................... 2310189

(51) Int. Cl.
*B64D 11/06* (2006.01)

(52) U.S. Cl.
CPC ........ *B64D 11/064* (2014.12); *B64D 11/0648* (2014.12); *B64D 11/0696* (2013.01)

(58) Field of Classification Search
CPC .......................... B64D 11/064; B64D 11/0696
See application file for complete search history.

(56) References Cited

U.S. PATENT DOCUMENTS 4,834,452 A 5/1989 Goodrich
5,333,818 A * 8/1994 Brandt ................. B64D 11/064 297/423.22
10,583,926 B2 3/2020 Erhel
10,906,649 B2 2/2021 Erhel
11,186,374 B2 11/2021 Erhel et al.
11,254,434 B2 2/2022 Erhel et al.
11,358,722 B2 6/2022 Erhel et al.
(Continued)

FOREIGN PATENT DOCUMENTS

CA 2976921 A * 8/2016 ......... B64D 11/0648
EP 3197709 B1 7/2021
(Continued)

OTHER PUBLICATIONS

Search Report for priority application FR 2310189.

*Primary Examiner* — Magdalena Topolski
*Assistant Examiner* — Shanna Danielle Glover
(74) *Attorney, Agent, or Firm* — Davidson Kappel LLC

(57) ABSTRACT

An aircraft seat structure with tapered base, and associated aircraft cabin, the seat structure includes a frame and a turret arranged above the frame, the turret being mounted rotatably relative to the frame about a vertical axis between a nominal rest configuration. The seat structure is oriented along a main direction and at least one configuration pivoted about the vertical axis relative to the nominal configuration. The seat structure further includes a main displacement carriage, movable along the main direction with respect to the frame and a seat pan support. The main displacement carriage is supported by the turret, being mounted movably in translation relative to the turret along the main direction in the nominal configuration, the main displacement carriage supporting the seat pan support.

14 Claims, 10 Drawing Sheets

(56) References Cited

U.S. PATENT DOCUMENTS

| | | | | |
|---|---|---|---|---|
| 11,447,254 | B2 | 9/2022 | Carrick et al. | |
| 2006/0108848 | A1* | 5/2006 | Williamson ............. | A47C 3/18<br>297/344.24 |
| 2013/0161990 | A1 | 6/2013 | Oleson | |
| 2018/0362165 | A1 | 12/2018 | Texeraud et al. | |
| 2019/0176991 | A1 | 6/2019 | Braca et al. | |
| 2019/0276152 | A1 | 9/2019 | Erhel et al. | |
| 2020/0407067 | A1 | 12/2020 | Koustubhan et al. | |
| 2021/0221520 | A1 | 7/2021 | Oleson | |
| 2022/0048627 | A1 | 2/2022 | Erhel et al. | |
| 2023/0373630 | A1 | 11/2023 | Billion et al. | |
| 2024/0359798 | A1* | 10/2024 | Martins ................ | B60N 2/3052 |

FOREIGN PATENT DOCUMENTS

| | | | |
|---|---|---|---|
| GB | 2590751 | B | 7/2021 |
| WO | WO2016049331 | A1 | 3/2016 |
| WO | WO2018178729 | A1 | 10/2018 |
| WO | WO2019115590 | A1 | 6/2019 |

* cited by examiner

AIRCRAFT STRUCTURE WITH TAPERED BASE, AND ASSOCIATED AIRCRAFT CABIN

The present disclosure relates to an aircraft seat structure, comprising:

a frame, intended to be fastened onto a floor of an aircraft cabin;

a turret arranged above the frame, the turret being mounted rotatably relative to the frame about a vertical axis between a nominal rest configuration wherein the seat structure is oriented along a main direction and at least one configuration pivoted about the vertical axis relative to the nominal configuration;

a main displacement carriage, movable along the main direction relative to the frame, a seat pan support.

BACKGROUND

An aircraft seat provided with such a structure is intended to be placed in an aircraft cabin, more particularly a cabin of a business jet, to provide a comfortable seating position for a passenger of the aircraft.

Passenger safety and comfort are essential elements in business aviation. In this respect, it is known to provide passengers of such aircraft with a seat which has a robust structure, in particular during the taxing, takeoff and landing (TTOL) phases.

The aircraft seat is also able to recline substantially, in particular down to a so-called “Zero G” position, wherein the passenger seated in the seat can rest, or even sleep, with a very comfortable support which is well distributed along the body.

In addition to being reclinable, the seat is generally able to pivot about a vertical axis, allowing the passenger to work or chat with other passengers by turning in an appropriate direction.

Seat structures, which guarantee the robustness of the seat, while making possible such diverse movements, are generally very complex.

A structure of the aforementioned type is known comprising a frame fastened on the ground, and a carriage for longitudinal displacement along the frame. Another intermediate transverse displacement carriage is mounted between the longitudinal displacement carriage and a turret on which the seat pan support is mounted.

Such a seat structure makes it possible to carry out the aforementioned movements. However, it is very bulky, especially at the base thereof, which gives the seat a massive appearance.

SUMMARY

An aim of the present disclosure is to obtain an aircraft seat structure which makes it possible to carry out displacements at least in longitudinal translation and in rotation, as well as an inclination of the seat toward a rest position of the passenger, while having a satisfactory aesthetic appearance.

To this aim, the present disclosure provides a seat structure of the aforementioned type, characterized in that the main displacement carriage is carried by the turret, being mounted so as to be movable in translation relative to the turret along the main direction in the nominal configuration, the main displacement supporting the seat support.

The seat structure according to the present disclosure can comprise one or a plurality of the following features, taken individually or according to any technically possible combination:

the main displacement carriage extends at least partly above the turret;

the main displacement carriage is mounted movably in translation in the turret;

one of the main displacement carriage and the turret comprises at least one guide rod, the other of the main displacement carriage and the turret delimiting a main passage for receiving the guide rod extending along the main direction, the at least one guide rod being mounted so as to be movable in translation in the main passage;

one of the main displacement carriage and the turret comprises two parallel guide rods, the other of the main displacement carriage and the turret including for each guide rod, a main passage for receiving a respective guide rod;

the width of the turret, taken perpendicularly to the main direction in the nominal configuration, is less than the width of the main displacement carriage, taken perpendicularly to the main direction in the nominal configuration;

the seat structure comprises a transverse displacement carriage, mounted movably along a transverse direction perpendicular to the main direction in the nominal configuration, the turret being mounted rotatably above the transverse displacement carriage;

the turret is rotatably mounted in the transverse displacement carriage;

one of the frame and the transverse displacement carriage comprises at least one transverse bar, the other of the frame and the transverse displacement carriage comprising a transverse passage for guiding the transverse bar wherein the transverse bar is received so as to be movable in translation in the transverse passage along the transverse direction;

one of the frame and the transverse displacement carriage comprises two parallel transverse bars, the other of the frame and the transverse displacement carriage comprising, for each transverse bar, a transverse passage for guiding the transverse bar wherein the transverse bar is received movably in translation along the transverse direction;

the frame comprises shoes mounted parallel to each other along the main direction in the nominal configuration and intended to be fastened onto the floor of the cabin, the or each transverse bar extending between the shoes;

the width of the transverse displacement carriage, taken along the transverse direction, is less than the width of the turret, taken along the transverse direction;

the seat structure includes a cover covering the frame, the turret, and the main displacement carriage, the cover having a convergent shape from top to bottom;

the seat pan support is articulated on the main displacement carriage, the seat structure comprising a backrest support articulated on the seat pan support.

A further subject matter of the present disclosure is an aircraft cabin, comprising a floor, and an aircraft seat, comprising a seat structure as defined hereinabove, mounted on the floor.

SUMMARY OF THE DRAWINGS

The present disclosure will be better understood upon reading the following description, given only as an example and making reference to the enclosed drawings, wherein.

DETAILED DESCRIPTION

Figure 1:
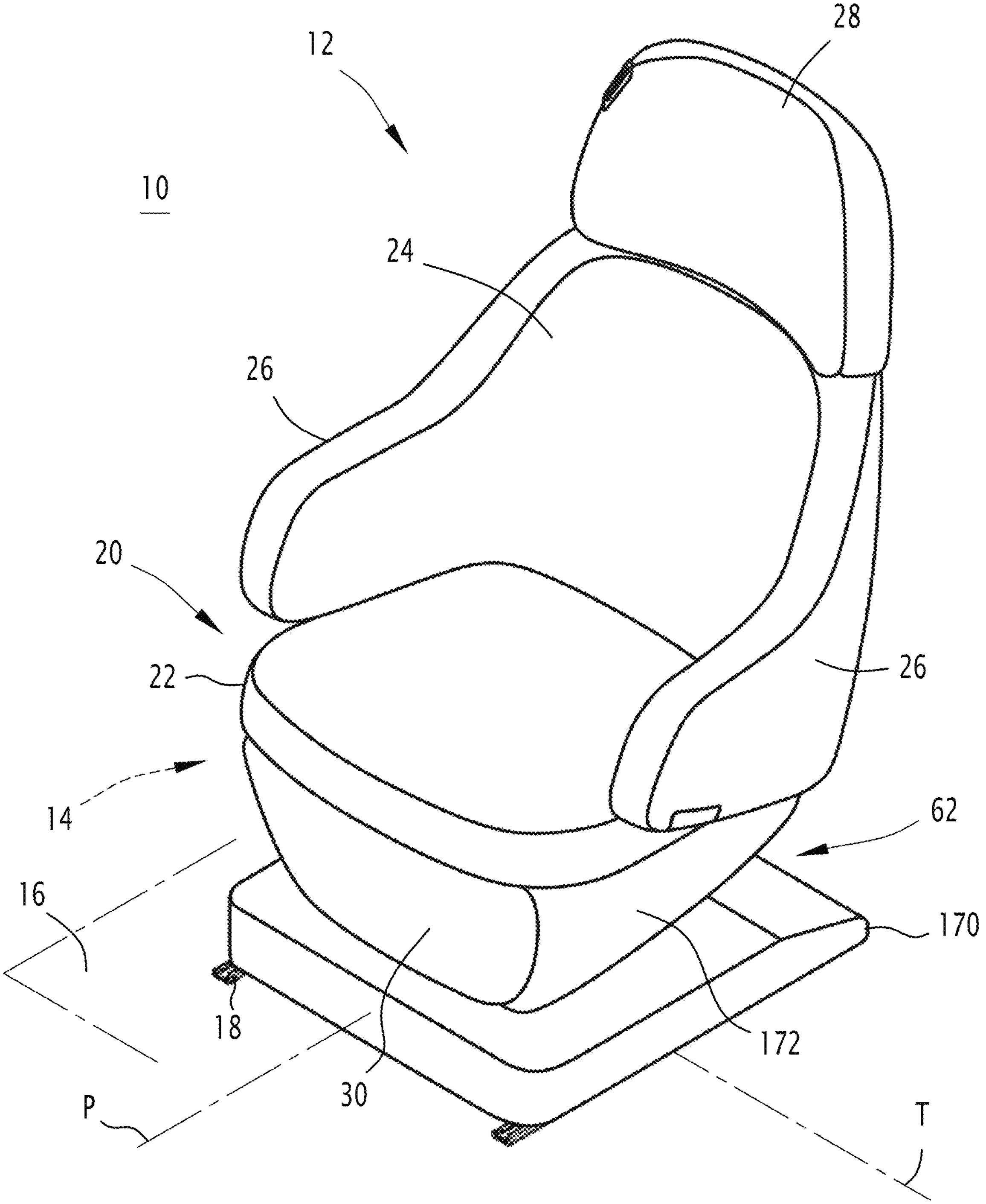
FIG. 1 is a front three-quarter perspective view of an aircraft seat mounted in an aircraft cabin, the seat being provided with a seat structure according to the present disclosure, occupying an upright position.
Figure 6:
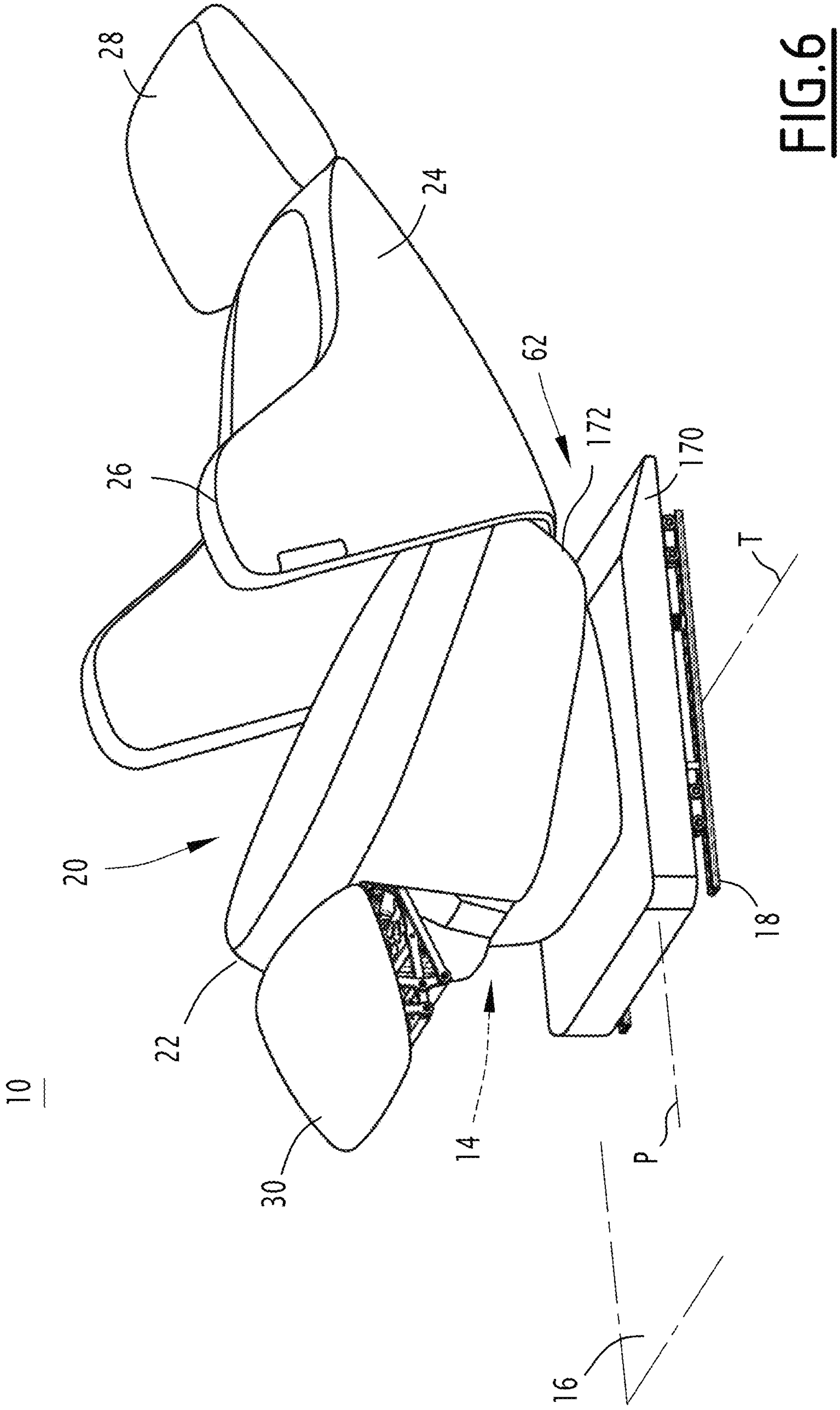
FIG. 6 is a view similar to FIG. 1, in a reclined position.
Figure 7:
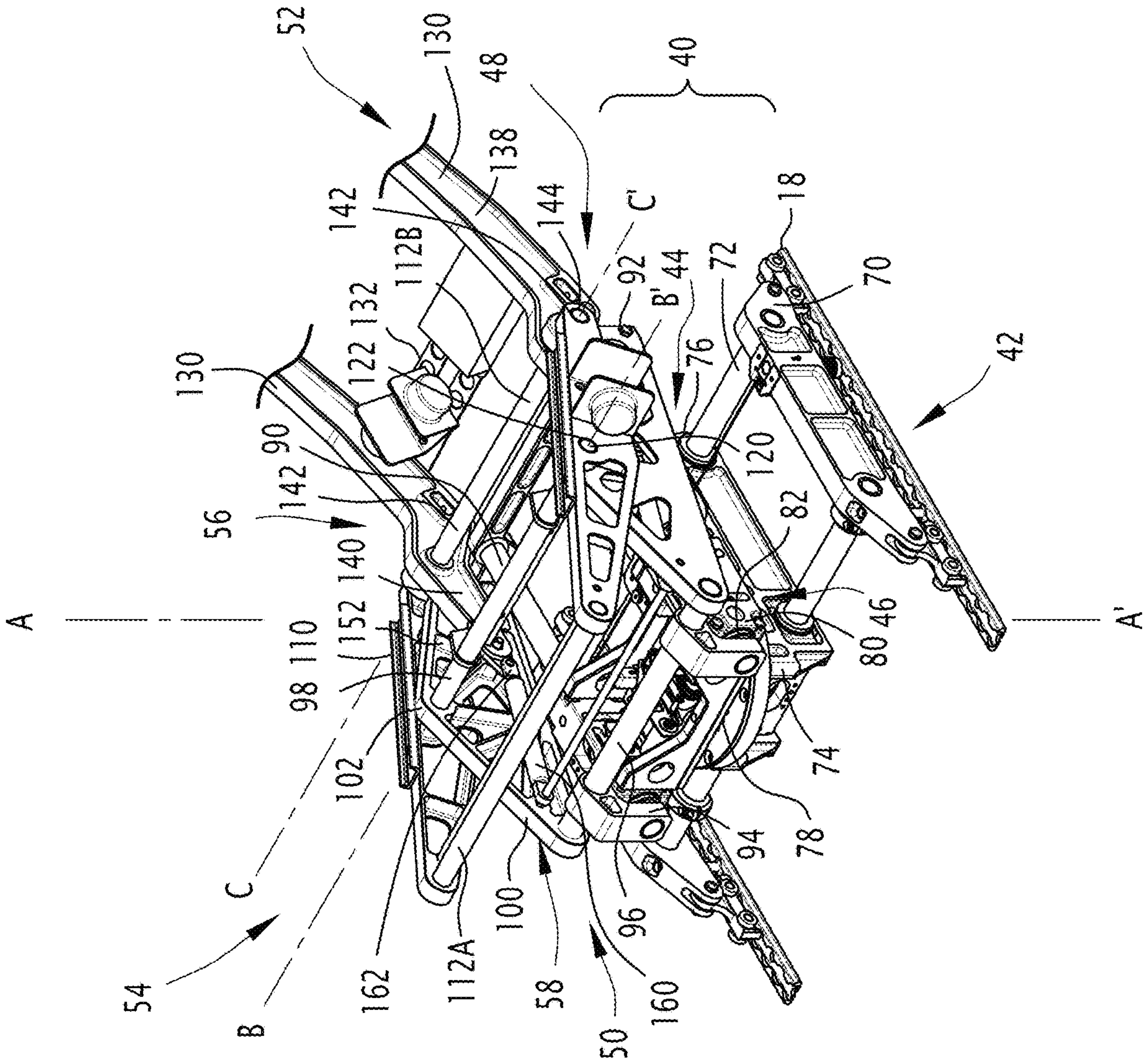
FIG. 7 is a view similar to FIG. 2, in the reclined position.
Figure 8:
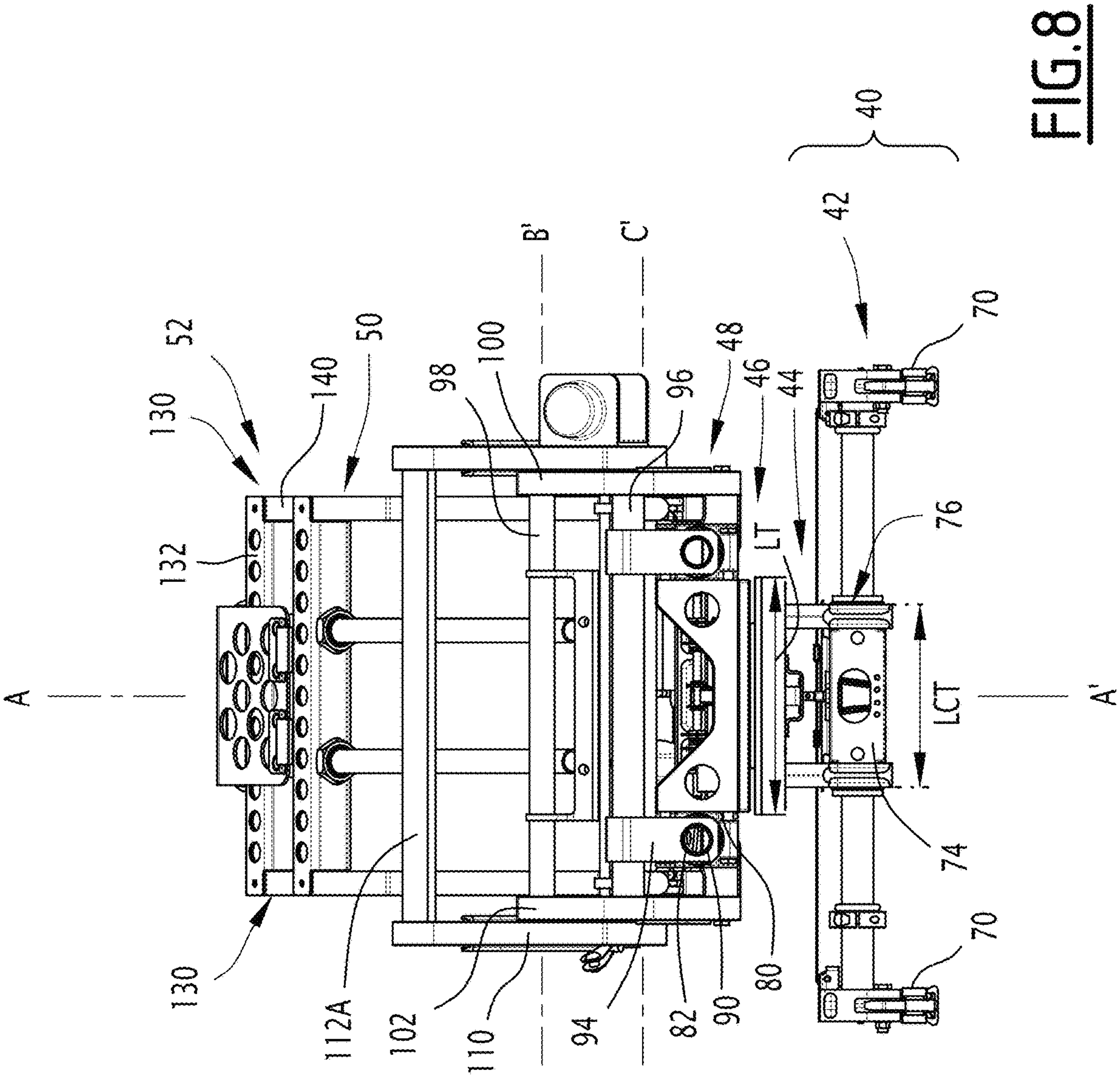
FIG. 8 is a view similar to FIG. 3, in the reclined position.

An aircraft cabin 10 including a seat 12 provided with a seat structure 14 according to the present disclosure is illustrated by FIGS. 1 and 6. The cabin 10 includes a floor 16 provided with rails 18 on which the seat 12 is mounted.

The seat 12 extends along a main direction P which generally corresponds, in a nominal configuration, in the absence of rotation of the seat 12, to a direction parallel to the longitudinal axis of the aircraft. Thereby, in the nominal configuration, a passenger seated in the seat 12 and who keeps his/her head straight, without turning his/her head, looks in the main direction.

As can be seen in FIGS. 1 and 6, the seat 12 and the structure 14 thereof can be maneuvered between an upright position, visible in FIG. 1, in particular used during the taxiing, the takeoff and the landing of the aircraft, and a reclined position, in particular a maximum inclination position called “zero G” wherein the seat 12 is reclined.

Furthermore, the seat 12 is maneuverable about a vertical axis A-A' (visible in FIG. 3) to be pivoted between the nominal configuration and at least one configuration pivoted relative to the nominal configuration. Preferably, the nominal configuration corresponds to a central orientation without any rotation of the seat 12 about the axis A-A', the seat 12 being pivotable on either side of the nominal configuration in pivoted configurations.

With reference to FIGS. 1 and 6, the seat 12 includes a trim 20 which comprises a seat pan 22, e.g. formed by a cushion, a backrest 24, including e.g. lateral support arms 26, and a headrest 28.

The seat 12 optionally comprises a footrest 30, deployable from a front edge of the seat pan 22.

As will be seen below, the seat structure 14 carries the elements of the trim 20, more particularly the seat pan 22, the back 24, the arms 26, the headrest 28, and the footrest 30, permitting relative movements between the elements of the trim 20, to move from the upright position to the reclined position and vice versa.

With reference to FIGS. 2 to 5, and 7 to 10, the seat structure 14 includes a base 40, intended to be mounted on the floor 16, more particularly on the rails 18, the base 40 including a frame 42, a transverse displacement carriage 44, mounted movably on the frame 42 along a direction T transverse to the main direction P and a turret 46, mounted rotatably on the transverse displacement carriage 44, about the vertical pivot axis A-A'.

The seat structure 14 further includes a main displacement carriage 48 mounted movably on the turret 46 along the main direction P, a seat pan support 50 supported by the main displacement carriage 48, and a backrest support 52 articulated with respect to the seat pan support 50 and with respect to the main displacement carriage 48.

The seat structure 14 further includes a system 54 for articulating the seat pan support 50 on the main displacement carriage 48 and a system 56 for articulating the backrest support 52 on the seat pan support 50 and on the main displacement carriage 48.

The seat structure 14 further includes an actuator 58 for moving the backrest support 52 and the seat pan support 50 to move the seat structure 14 between the upright position and the reclined position.

The seat structure 14 further includes a footrest support 60 (visible in FIG. 4), and a masking assembly 62 (visible in FIG. 1), intended to mask same from the outside under the trim 20.

The frame 42 fastens the seat structure 14 to the floor 16, more particularly via the rails 18.

It includes two parallel shoes 70 extending along the main direction P and at least one transverse bar 72, preferably two transverse bars 72 connecting the parallel shoes 70 together.

Each shoe 70 has herein the shape of a trapezoid having a small base defined by the upper edge thereof, and a large base defined by the lower edge thereof.

The lower edge of each shoe 70 is provided with a removable attachment mechanism on a rail 18 for fastening the seat structure 14 on the floor 16 at a predetermined adjustable position along the rail 18.

The transverse bars 72 extend perpendicularly to the shoes 70.

The transverse displacement carriage 44 is mounted to move in translation on the frame 42 along the transverse direction T. It includes a base body 74 defining, for each transverse bar 72, a passage 76 for receiving the transverse bar 72.

The receiving passage 76 opens out on both sides of the body 64 parallel to the transverse direction T on the lateral faces of the body 74. In the present example, it has an internal section with a shape matching the external section of each transverse bar 72. Thereby, the body 74 is mounted in an exclusively sliding manner on the bars 72.

The body 74 further delimits a vertical orifice 78 opening out upwards for receiving the turret 46.

The turret 46 is rotatably mounted in the vertical orifice 78 of the body 74 of the frame 42. It is thereby pivotally mounted on both sides of the nominal configuration with respect to the transverse displacement carriage 44 about a vertical axis A-A' defined by the vertical orifice 78.

The turret 46 thereby includes a foot (not visible) inserted into the vertical orifice 78 and a support 80 protruding from the transverse displacement carriage 44, above the transverse displacement carriage 44.

The support 80 defines, along the lateral faces thereof, two main passages 82 for guiding the main displacement carriage 48 in translation along the main direction P. The main passages 82 extend horizontally, and herein open out on both sides of the support 80.

In the nominal configuration, in the absence of any rotation of the turret 46 about the vertical axis A-A', the main passages 82 extend along the main direction P.

The width LT of the turret, taken along the transverse direction T, is greater than the width LCT of the transverse displacement carriage 44, taken along the transverse direction T.

The main displacement carriage 48 is mounted movably in translation in the turret 46.

In the nominal configuration, in the absence of any rotation about the vertical axis A-A', the main displacement carriage 48 is movable in translation along the main direction P between a front configuration and a rear configuration.

Figure 2:
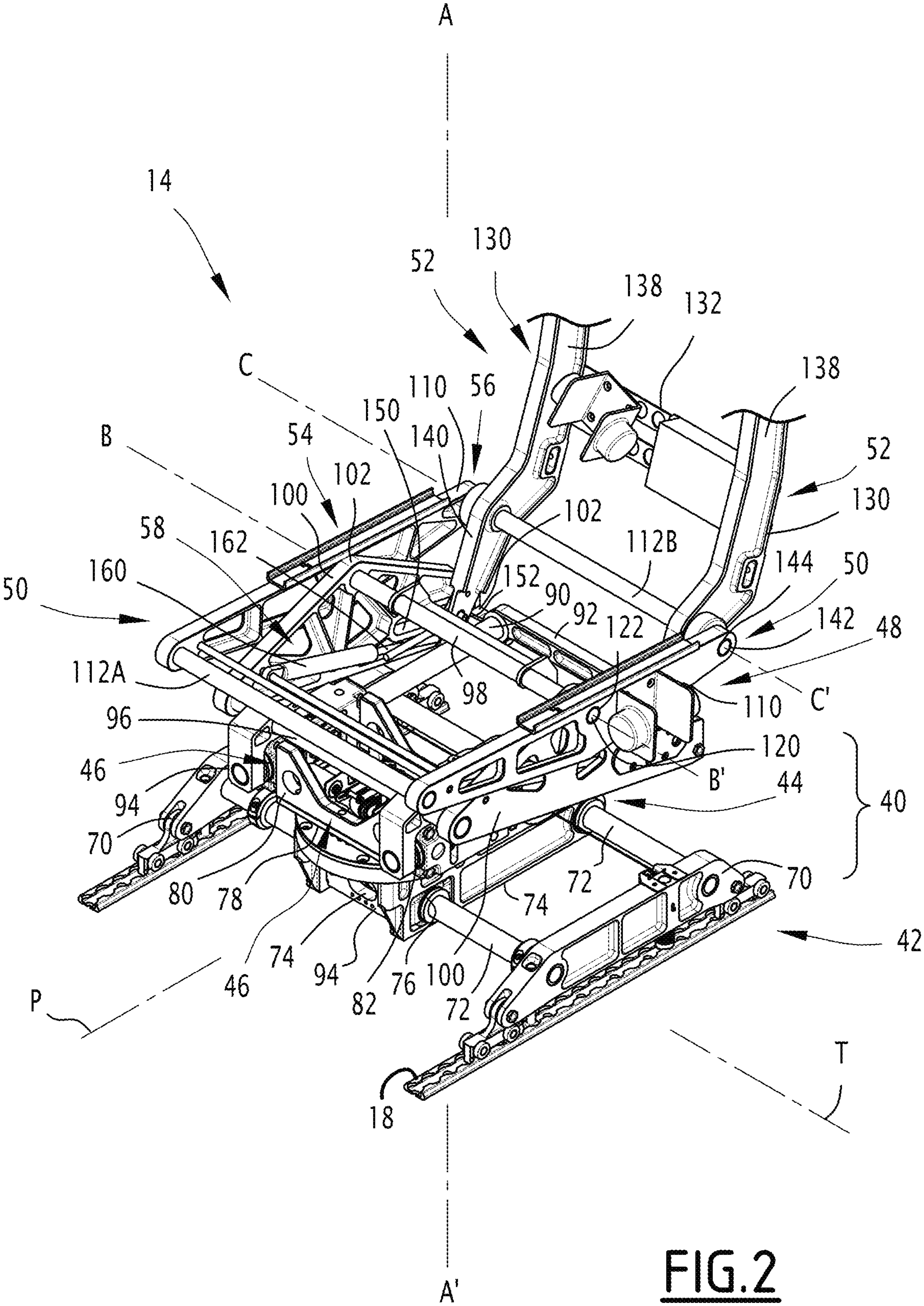
FIG. 2 is a perspective partial view of the seat structure shown in FIG. 1.
Figure 3:
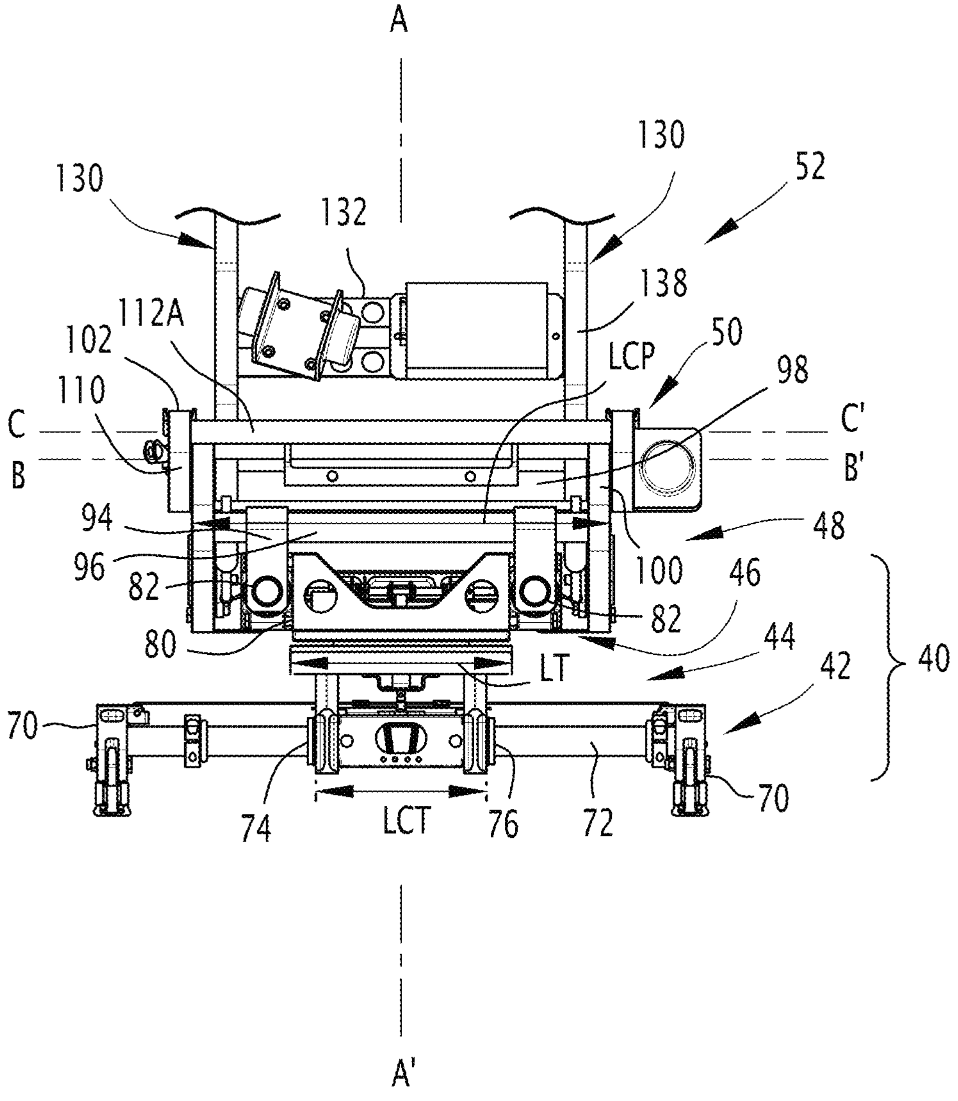
FIG. 3 is a front view of the seat structure shown in FIG. 1.

As can be seen in FIGS. 2 and 3, the main displacement carriage 48 includes a lower part mounted in the turret 46, and an upper part supporting the seat pan support 50 and the backrest support 52.

The lower part includes a guide frame including at least one guide rod 90, preferably two parallel guide rods 90, each guide rod 90 being mounted slidably parallel to the main direction P in a main passage 82.

The guide frame further includes a transverse rear tie rod 92 connecting the rear ends of the guide rods 90, and, for each guide rod 90, a front leg 94 for connecting with the upper part of the main displacement carriage 48, protruding upwards from the front end of the guide rod 90.

The upper part is fixedly mounted on the lower part. It includes, in the present example, a lower cross-piece 96 and or an upper cross-piece 98. It further includes two lateral flanges 100 connecting the cross-pieces 96, 98, and for each flange 100, a horizontal finger 102 for connecting with the lower part (visible in FIG. 2).

The lower cross-piece 96 and the upper cross-piece 98 extend parallel to the transverse direction T.

The lower cross-piece 96 connects the ends of the vertical legs 94 above the body 74 of the turret 46. It extends laterally beyond the edges of the turret 86 on both sides of the turret 46.

The upper cross-piece 98 extends above the lower cross-piece 96. It also extends to the rear of the lower cross-piece 96, between the lower cross-piece 96, and the rear end of the flanges 100.

The flanges 100 extend along the main direction P, parallel to the latter, at a distance from each other.

In the present example, each flange 100 has a triangular shape, with a top 102 situated between the front end and the rear end of the flange 100. In the present example, the top 102 extends substantially in the middle of the flange 100 between the ends of the flange 100, taken along the main direction P.

The upper cross-piece 98 connects the tops 102 of the flanges 100. The ends of the upper cross-piece 98 protrude beyond the flanges 100, toward the outside of the support structure 14.

The fingers 102 connect the rear ends of the flanges 100 to the tie rod 92. They extend horizontally and transversely.

The lower cross-piece 96 connects the front ends of the flanges 100.

In the present example, the flanges 100 are partially perforated.

The width LCP of the main displacement carriage, taken along the transverse direction T, is greater than or equal to the width LT of the turret 46, taken along the same direction.

The seat support 50 includes a frame comprising longitudinal beams 110 and cross-pieces 112A, 112B connecting the longitudinal beams 110 at the front and rear ends thereof.

Each main beam 110 extends along a respective side of the main displacement carriage 48, adjacent to a flange 100.

The length of each main beam 110 is greater than the length of the adjacent flange 100. Thereby, the cross-piece 112A connecting the front ends of the flange 100 extends to the front of the lower cross-piece 96, and the cross-piece 112B connecting the rear ends of the main beams 110 preferably extends at the rear of the tie rod 92 of the main displacement carriage 48.

The seat pan 22 is mounted on the seat pan support 50.

As will be described hereinbelow, the seat pan support 50 is thereby articulated on the main displacement carriage 48 about a front articulation axis B-B'.

The front articulation axis B-B' extends parallel to the transverse direction T.

In a projection onto a vertical median plane of the seat structure 14, the front articulation axis B-B' is located between the front edge and the rear edge of the main displacement carriage 48.

The front articulation axis B-B' extends along the upper cross-piece 98, at the tops 102 of the flanges 100.

The articulation system 54 of the seat pan support 50 includes herein, for each main beam 110, an articulation pivot 120 rigidly attached to the main displacement carriage 48, and an orifice 122 for receiving and guiding the pivot 120, provided in the main beam 110.

In the present example, each pivot 120 is formed by a respective protruding end of the upper cross-piece 98, which protrudes along the transverse direction T beyond the lateral flange 100. The orifice 122 is provided in a middle part of the main beam 110 along the transverse direction T.

The backrest support 52 comprises two parallel uprights 130 protruding upwards and rearwards with respect to the main beams 110 of the seat pan support 50.

The backrest support 52 further includes at least one rear plate 132 and/or a transverse rib (not shown) connecting the uprights 130 to one another in order to keep them parallel to one another.

Each upright 130 is mounted rotatably with respect to the seat pan support 50 about a rear articulation axis C-C' parallel to the front articulation axis B-B'.

The rear articulation axis C-C' divides the upright 130 into an upper part 138, located above the rear articulation axis C-C' and into a lower arm 140 located below and in front of the rear articulation axis C-C'.

The length of the arm 140 is shorter than the length of the upper part 138 of the upright 130, e.g. shorter than at least twice the length of the upper part 138.

Each upright 130 extends between the flanges 100, adjacent to a flange 100 opposite a main beam 110.

The backrest 24 and the headrest 28 are mounted on the backrest support 52.

The articulation system 56 of the backrest support 52 includes, in the present example, a pivot formed by the rear cross-piece 112B of the seat pan support 50, which extends through each upright 130 and by an orifice 144 for guiding the pivot 142, provided in the upright 130 between the lower arm 140 and the upper part 138.

The articulation system 56 of the backrest support 52 further includes a mechanism for guiding the displacement of each upright 130 relative to the main displacement carriage 48.

The guide mechanism includes a slide 150, provided in a lateral flange 100 adjacent to the upright 130, and a slider 152 formed herein by a pin slidably inserted in the slide 150.

In the present example, the slide 150 extends at the rear of the front articulation axis B-B', and at the front of the rear articulation axis C-C'. Herein, it extends linearly, being inclined with respect to a horizontal plane by an angle greater than 5° and comprised e.g. between 10° and 20°.

The inclination of the slide 150 is oriented upwards when moving from the rear to the front.

The slider 152 is mounted so as to protrude transversely outwards from the lower arm 140 of the upright 130. It is slidably received in the slide 150 and follows the linear path of the slide 150.

The actuator 58 includes herein a cylinder comprising a cylinder body 160 and a member 162 that can be deployed with respect to the cylinder body 160 between a deployed position and a retracted position.

In the present example, the cylinder body 160 is articulated at a front articulation point 164 on one of the lateral flanges 100 about a transverse front axis.

The front articulation point 164 is located at the rear of the front end of the lateral flange 100, below and in front of the front articulation axis B-B'. It is located at the rear of the front edge of the seat support defined by the front cross-piece 112A.

The deployable member 162 is herein formed by a cylinder rod. It is articulated on the lower arm 140 about a rear transverse axis at a rear articulation point 166 situated at the slider 152, or in the vicinity thereof.

The retraction of the deployable member 162 from the deployed position thereof to the retracted position thereof moves the slider 152 forwards in the slide 150 and, jointly, displaces the lower arm 140 along the slide 150. On the other hand, the deployment of the deployable member 162 from the retracted position thereof to the deployed position thereof displaces the slider 152 rearward in the slide 150 and, jointly, displaces the lower arm 140 along the slide 150.

Figure 5:
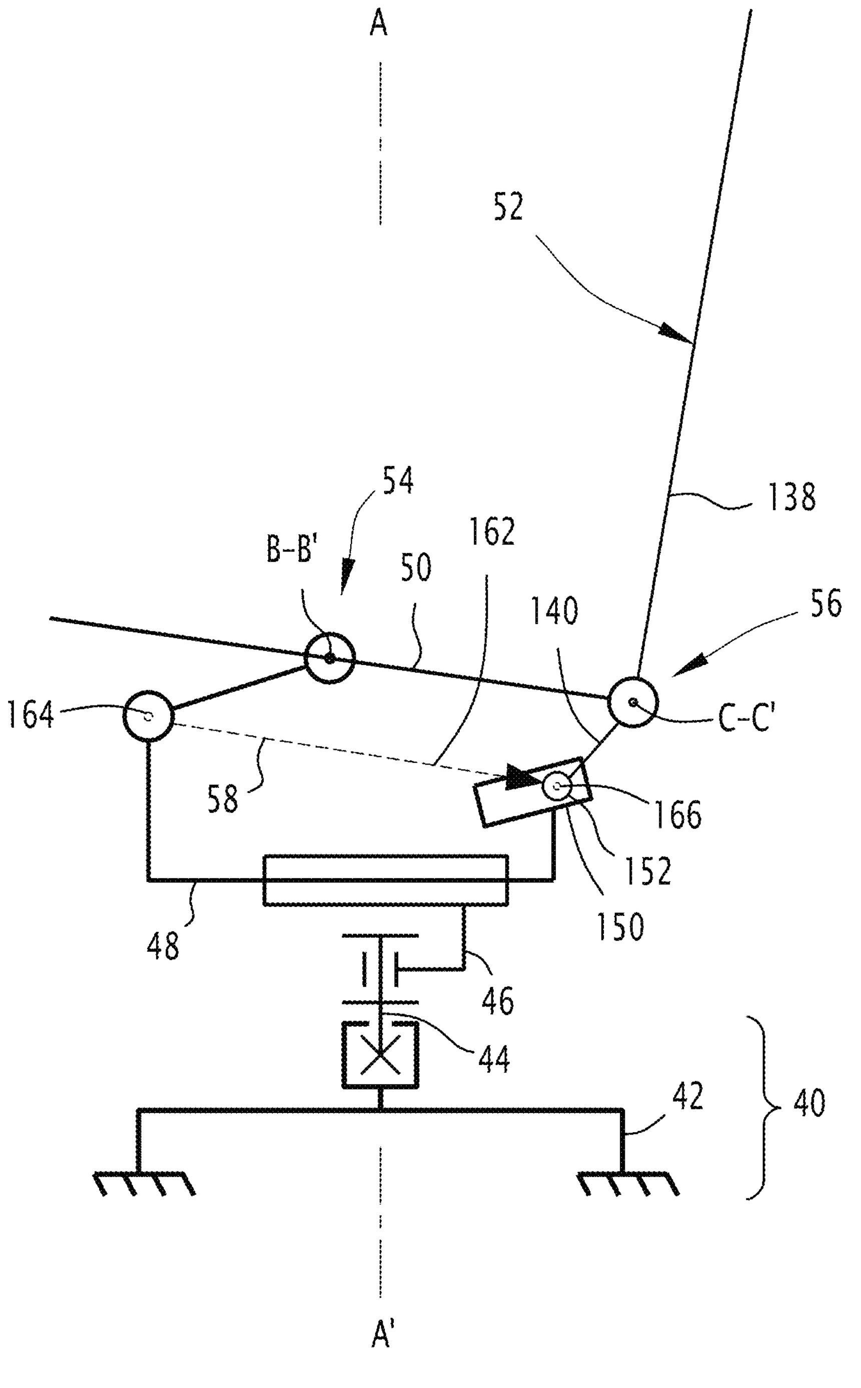
FIG. 5 is a diagram showing the kinematics of the seat structure in the upright position.
Figure 10:
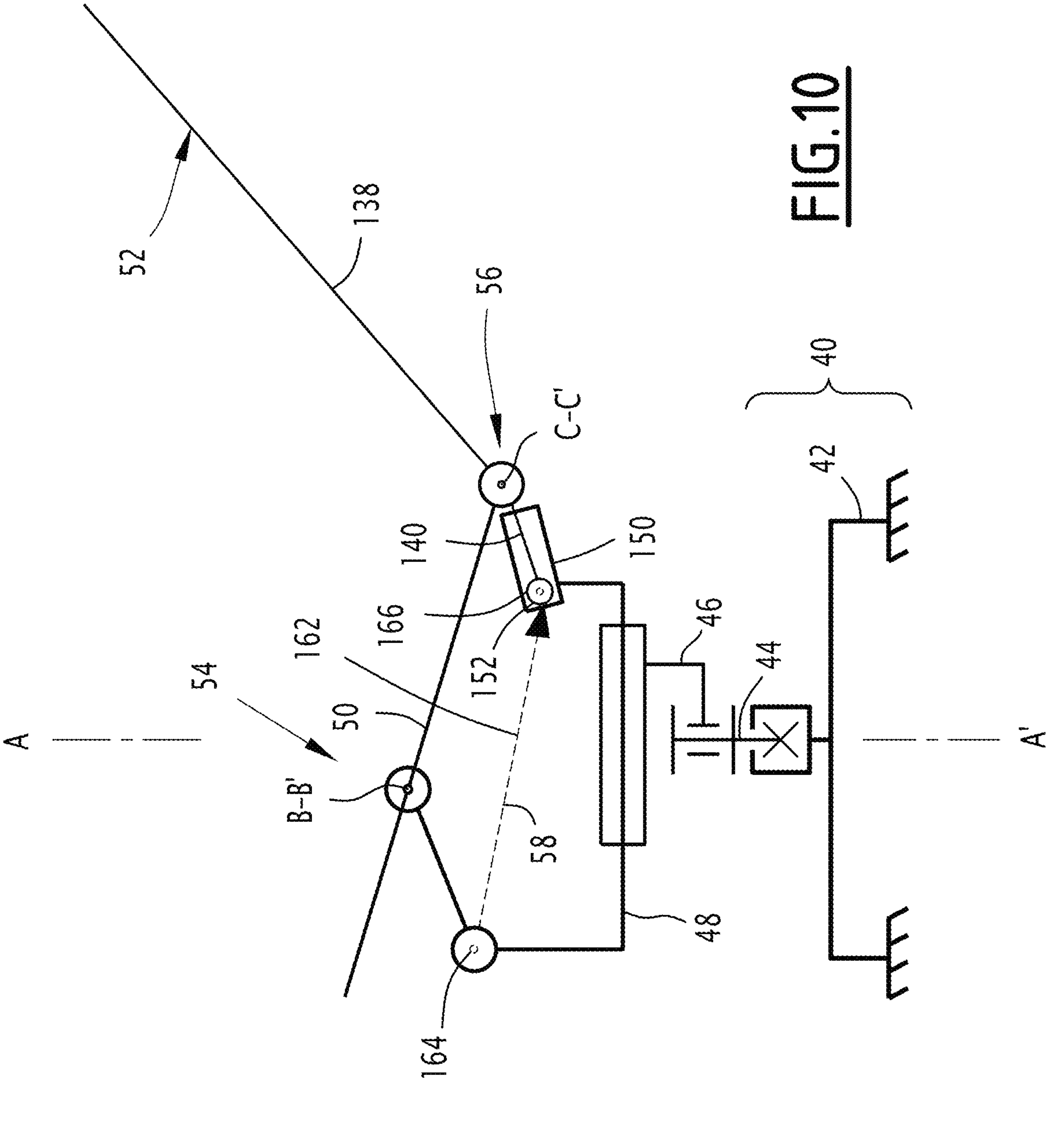
FIG. 10 is a view similar to FIG. 5, in the reclined position.

With reference in particular to FIG. 5 and FIG. 10, the rear articulation point 166 is located below and in front of the rear articulation axis C-C'. It is also located below and at the rear of the front articulation axis B-B'.

As can be seen in FIG. 1, the masking assembly 62 advantageously includes a lower cover 170 covering the base frame 42 upwards. In the present example, the lower cover 170 has a substantially H-shape in a projection onto the floor 16.

The masking assembly 62 further includes an upper cover 172 with a shape which is tapered downwards, which covers, on the sides, forwards and backwards, the transverse displacement carriage 44, the turret 46, the main displacement carriage 48 and the seat pan support 50.

The width of the upper cover 172, taken along the transverse direction T, along the lower edge thereof, is e.g. less than 95% of the width of the lower cover 172, taken along the transverse direction T, along the upper edge thereof.

Due to the width of the support structure 14 gradually decreasing as it moves vertically from the seat pan support 50 to the frame 42, the shape of the upper cover 172 is tapered downwards. Thereof gives the masking assembly 62 a pleasant aesthetic appearance, in particular by providing it with a tapered base, advantageously of ovoid, non-massive overall shape.

The downwardly tapered shape of the upper cover 172 results from the particular configuration of the arrangement of the transverse displacement carriage 44 directly on the frame 42, of the articulation of the turret 46 on the transverse displacement carriage 44, and of the mounting of the main displacement carriage 48 and of the seat pan support 50 above the turret 46.

Figure 4:
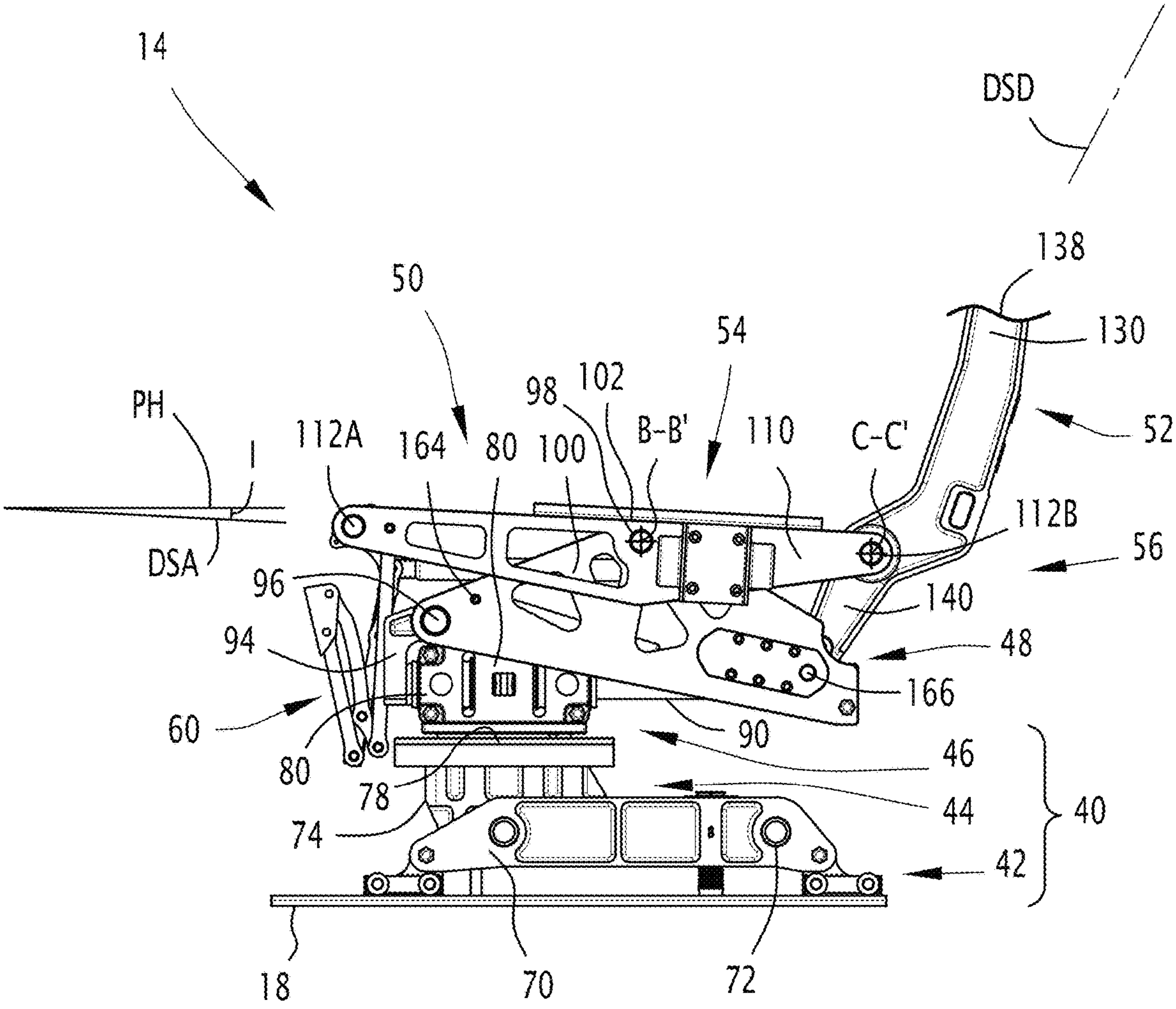
FIG. 4 is a side view of the seat structure shown in FIG. 1.
Figure 9:
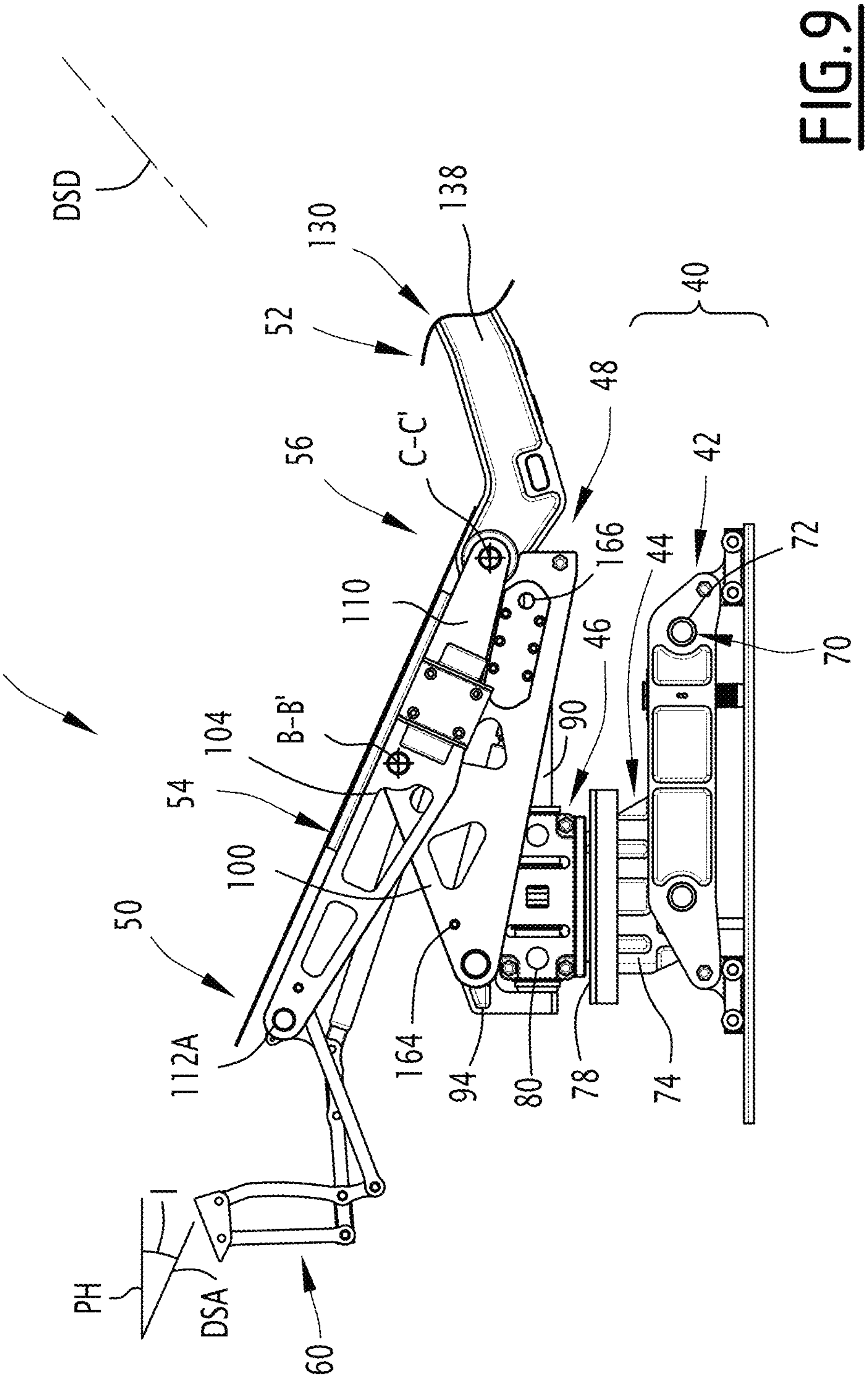
FIG. 9 is a view similar to FIG. 4, in the reclined position.

With reference to FIGS. 4 and 9, the footrest support 60 is herein formed by a parallelogram articulated at the front of the seat pan support 50, which can be actuated by a cylinder (not shown). It can be deployed between a retracted position, wherein the footrest 30 extends substantially vertically bearing against the front of the upper cover 172, and an active position protruding from the front of the seat pan support 50. It is advantageously articulated on the front cross-piece 112A of the seat pan support.

The operation of the seat 12 will now be described.

Initially, the seat 12 is e.g. in the upright position shown in FIG. 1.

In such position, the cylinder rod 162 occupies the deployed position thereof. The rear articulation point 166 and the slider 152 are situated behind the slide 150, relatively closer to the rear articulation axis C-C'.

The upper part 138 of the upright 130 is straightened forwards because of the lower arm 140 being held relatively downwards and rearwards.

Also in said position, as shown in FIG. 4, the angle of inclination I of the seat pan support 50 with respect to a horizontal plane PH is minimal. The rear articulation axis C-C' is raised toward the front articulation axis B-B'. The front cross-piece 112A is lowered to a minimum height relative to the front pivot axis B-B'.

The inclination of the seat pan support 50 with respect to a horizontal plane, measured by the straight-line DSA connecting the points of intersection of the front articulation axis B-B' and the rear articulation axis C-C' with a plane perpendicular to said axes, is less than 15° and comprised in particular between 0° and 10°.

Similarly, the obtuse angle formed between the straight-line DSA and the straight line DSD connecting the point of intersection of the rear articulation axis C-C' and the projection of the rear articulation point 166 onto the same plane has a value less than 130° and comprised e.g. between 110° and 120°.

In such position, the user can move the seat 12 along the transverse direction, via a displacement of the transverse displacement carriage 44 with respect to the frame 42, by a sliding of the body 74 on the bars 72.

Similarly, the user can control the rotation of the seat 12 about the axis A-A', by generating a rotation of the turret 46, of the main displacement carriage 48 and of the seat pan support 50 about the axis A-A' of rotation of the turret 46 with respect to the transverse displacement carriage 44.

Furthermore yet, the user can move the main displacement carriage 44 and the seat support 50 relative to the turret 46 by translation along the main direction P by sliding the guide rods 90 in the main passages 82 of the turret 46.

When the user wishes to tilt the seat 12, the user controls the actuator 58 to move the cylinder rod 162 from the deployed position thereof to the retracted position thereof. Such displacement is guided by the sliding of the slider 152 in the slide 150, which raises the rear articulation point 166 and brings it closer to the front articulation axis B-B'.

Such displacement then produces a downward displacement of the rear articulation axis C-C' and a relative pivoting of the backrest support 52 backwards and downwards with respect to the seat pan support 50.

The rear edge of the seat pan support, embodied by the rear cross-piece 112B, moves downwards and forwards by pivoting the seat pan support 50 about the rear articulation axis C-C'.

The front edge of the seat pan support, represented by the front cross-piece 112A, moves upwards and backwards, raising relative to the rear cross-piece 112B.

Thereby, the obtuse angle formed between the straight-line DSA and the straight-line DSD increases, e.g. to a value greater than 130° and in particular comprised between 140° and 160°.

Similarly, the angle of inclination I of the straight-line DSA with respect to a horizontal plane PH increases to a value greater than 15° and in particular comprised between 20° and 30°.

When the slider 152 abuts against the front end of the slide 150, the seat 12 occupies the reclined position thereof.

The user can then deploy the footrest support 60 to place the footrest 30 protruding from the front of the seat pan 22.

Due to the arrangement of the rear articulation point 166 at the rear of the front articulation axis B-B', over the entire travel of the deployable member 162 formed by the cylinder rod between the retracted position and the deployed position, it is possible to obtain a significant inclination of the backrest support 52 with respect to the seat pan support 50 in the reclined position, by a very simple mechanism which uses a minimum number of parts and connections.

The aforementioned arrangement of the rear articulation point 166 and the configuration of the main displacement carriage 48 and of the articulation systems 54, 56 of the seat pan support 50 and of the backrest support 52 thereby significantly increase the reliability of maneuvering the seat 12 between the upright position thereof and the reclined position thereof, and reduce the overall mass of the seat.

In a variant, the slide 150 is delimited in the lower arm 140, and the slider 152 is mounted on the flange 100.

In a variant of each of the preceding embodiments, a pivot 120 is formed in each main beam 110, and an orifice 122 for the pivot 120 is provided in the lateral flange 100.

Similarly, in a variant of each of the preceding embodiments, a pivot 142 is provided on each upright 130, and a corresponding orifice 144 is provided in the corresponding beam 110.

What is claimed is:

1. An aircraft seat structure comprising:

a frame to be fastened onto a floor of an aircraft cabin;

a turret arranged above the frame, the turret being mounted rotatably relative to the frame about a vertical axis between a nominal rest configuration wherein the seat structure is oriented along a main direction and at least one configuration pivoted about the vertical axis relative to the nominal rest configuration;

a main displacement carriage movable along the main direction with respect to the frame; and a seat pan support;

the main displacement carriage being supported by the turret and being mounted movable in translation relative to the turret along the main direction in the nominal rest configuration, the main displacement carriage supporting the seat pan support;

a transverse displacement carriage mounted movably along a transverse direction perpendicular to the main direction in the nominal rest configuration, the turret being rotatably mounted above the transverse displacement carriage.

2. The seat structure according to claim 1, wherein the main displacement carriage extends at least partially above the turret.

3. The aircraft seat structure according to claim 1, wherein the main displacement carriage is movably mounted in the turret.

4. The seat structure according to claim 3, wherein one of the main displacement carriage and of the turret comprises at least one guide rod, another one of the main displacement carriage and of the turret delimiting a main passage receiving the at least one guide rod, the main passage extending along the main direction, the at least one guide rod being mounted movable in translation in the main passage.

5. The seat structure according to claim 4, wherein the one of the main displacement carriage and of the turret comprises two parallel guide rods, the other of the main displacement carriage and of the turret comprising, for each respective guide rod, a respective main passage receiving the respective guide rod.

6. The seat structure according to claim 1, wherein a width of the turret, taken perpendicularly to the main direction in the nominal rest configuration, is less than a width of the main displacement carriage, taken perpendicularly to the main direction in the nominal rest configuration.

7. The seat structure according to claim 1, wherein the turret is rotatably mounted in the transverse displacement carriage.

8. The seat structure according to claim 1, wherein one of the frame and of the transverse displacement carriage comprises at least one transverse bar, the other of the frame and of the transverse displacement carriage comprising a transverse passage to guide the at least one transverse bar, the at least one transverse bar being movable in translation in the transverse passage along the transverse direction.

9. The seat structure according to claim 8, wherein the one of the frame and of the transverse displacement carriage comprises two parallel transverse bars, the other of the frame and of the transverse displacement carriage comprising, for each respective transverse bar, a respective transverse passage to guide the respective transverse bar, the respective transverse bar being movable in translation along the transverse direction.

10. The seat structure according to claim 8, wherein the frame comprises shoes mounted parallel to each other along the main direction in the nominal rest configuration, the shoes being configured to be fastened to the floor of the cabin, the at least one transverse bar extending between the shoes.

11. The seat structure according to claim 1, wherein a width of the transverse displacement carriage, taken along the transverse direction, is less than a width of the turret, taken along the transverse direction.

12. The seat structure according to claim 1, comprising a cover covering the frame, the turret, and the main displacement carriage, the cover having a convergent shape from top to bottom.

13. The seat structure according to claim 1, wherein the seat pan support is articulated to the main displacement carriage, the seat structure comprising a backrest support articulated to the seat pan support.

14. An aircraft cabin comprising:

a floor; and an aircraft seat, the aircraft seat comprising a seat structure according to claim 1, mounted on the floor.

* * * * *